Feb. 7, 1933. A. S. JOHNSON 1,896,687
AUTOMATIC TRAIN PIPE CONNECTER
Filed July 19, 1930 13 Sheets-Sheet 1

Inventor
Albert S. Johnson.
Attorney.

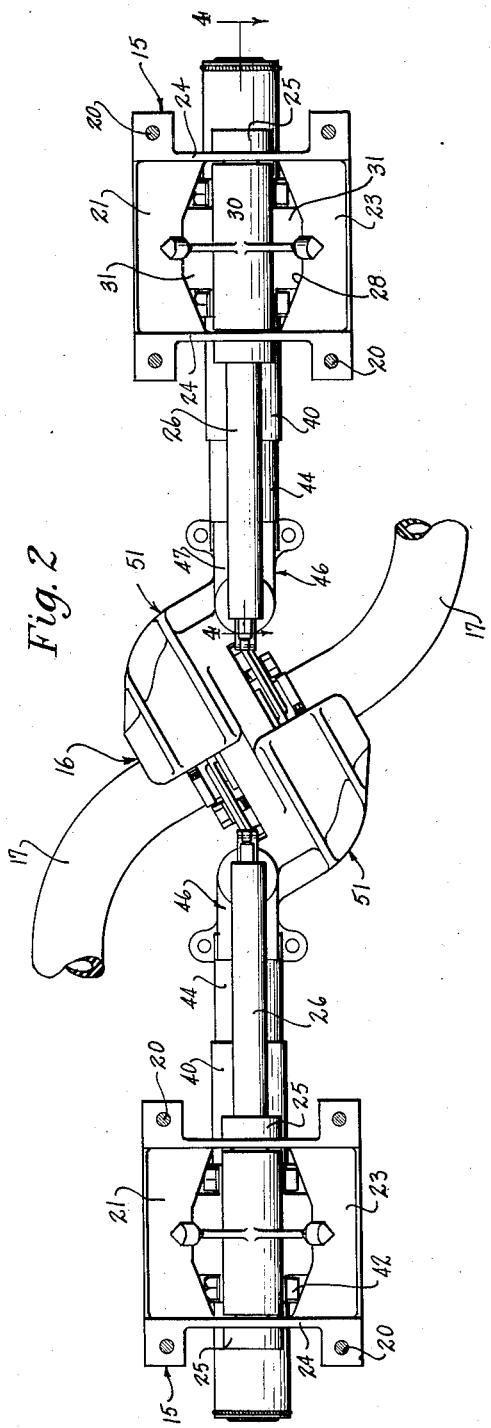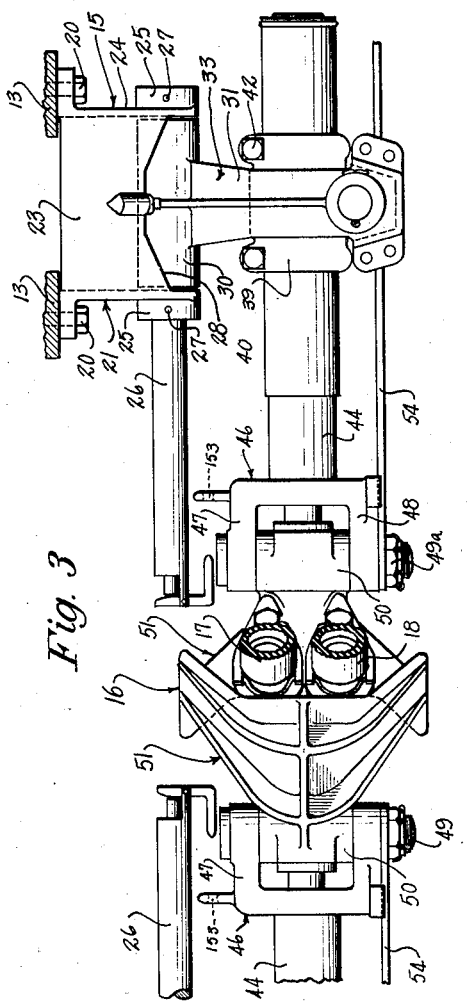

Feb. 7, 1933.    A. S. JOHNSON    1,896,687
AUTOMATIC TRAIN PIPE CONNECTER
Filed July 19, 1930    13 Sheets-Sheet 3
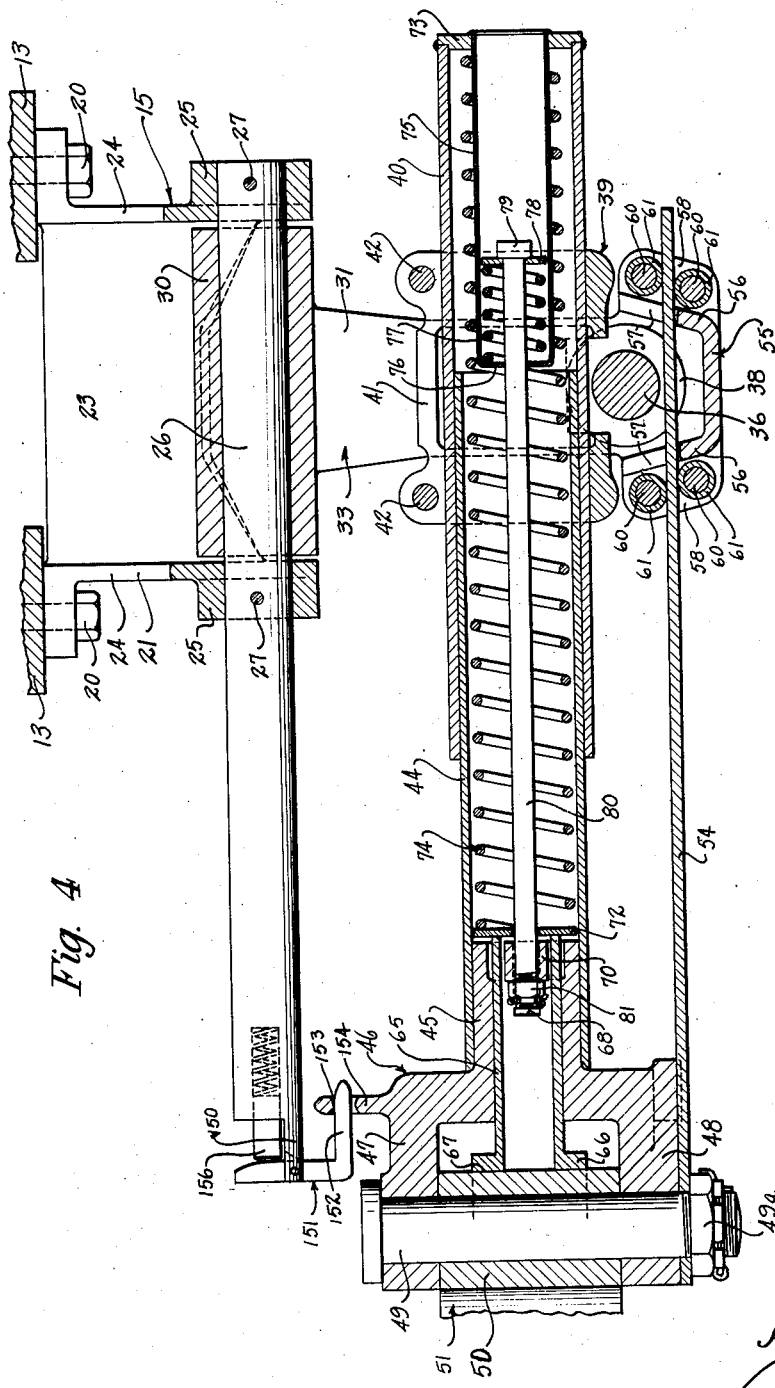
Fig. 4
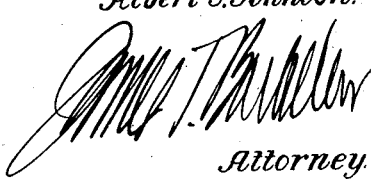
Inventor
Albert S. Johnson.
Attorney

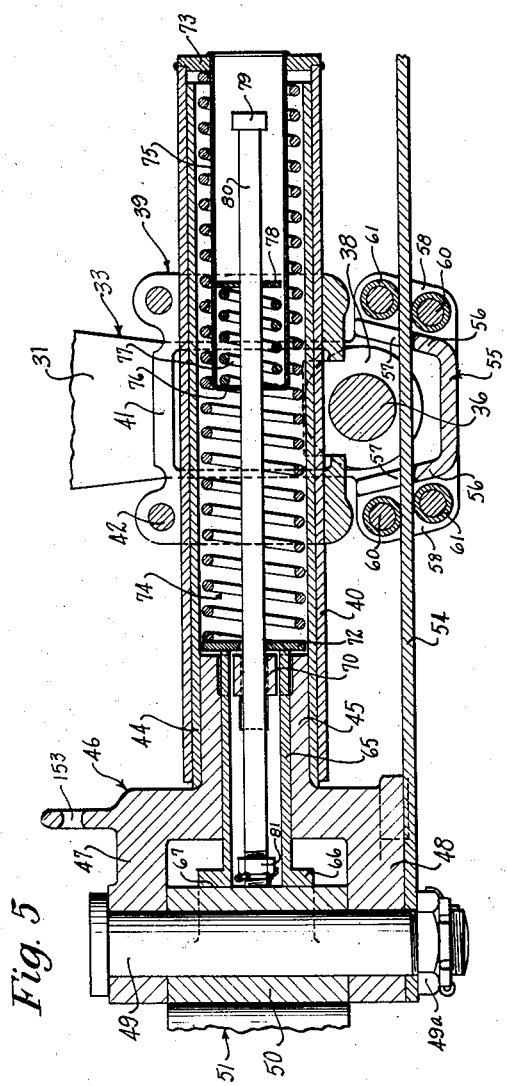
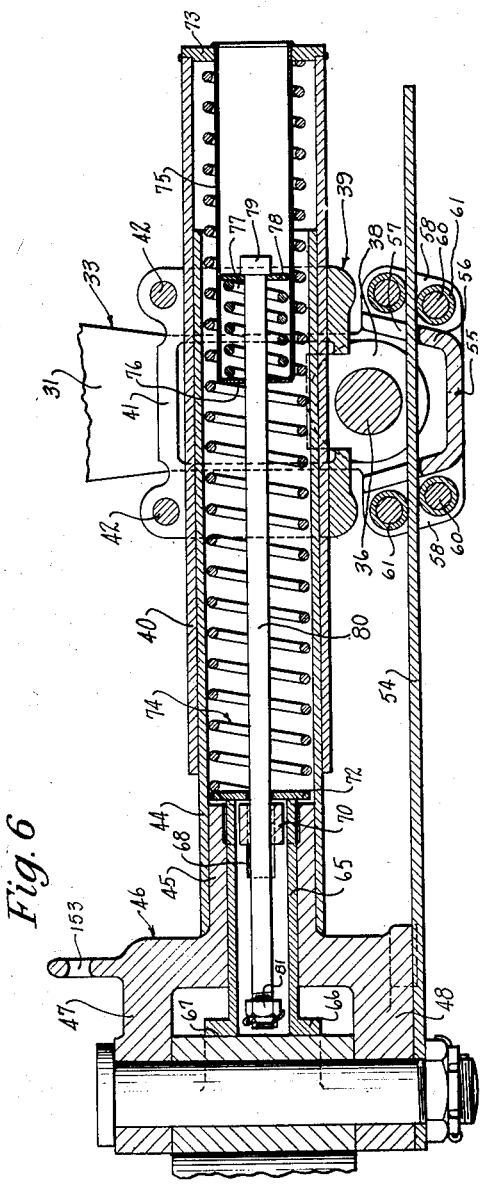

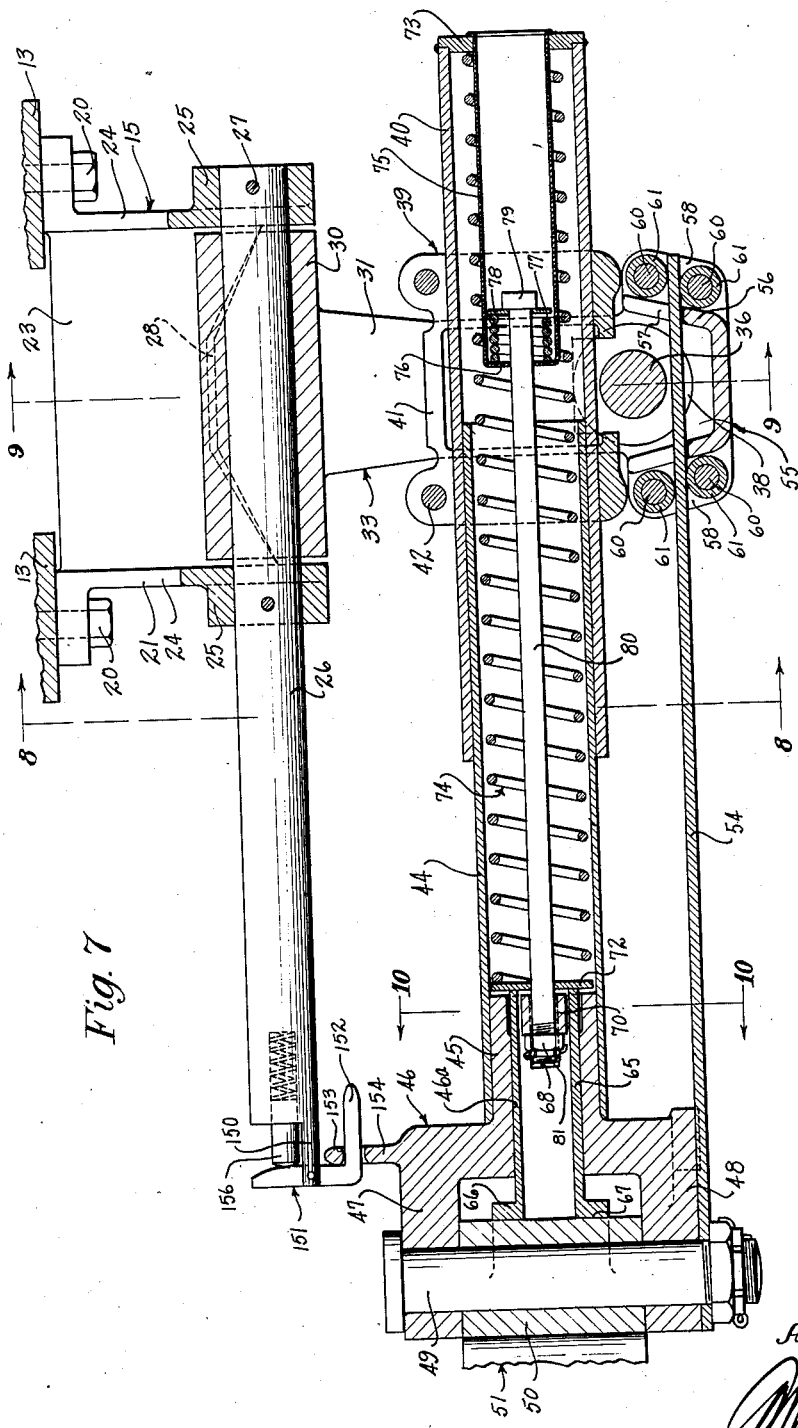

Feb. 7, 1933.    A. S. JOHNSON    1,896,687
AUTOMATIC TRAIN PIPE CONNECTER
Filed July 19, 1930    13 Sheets-Sheet 6

Inventor
Albert S. Johnson.
Attorney

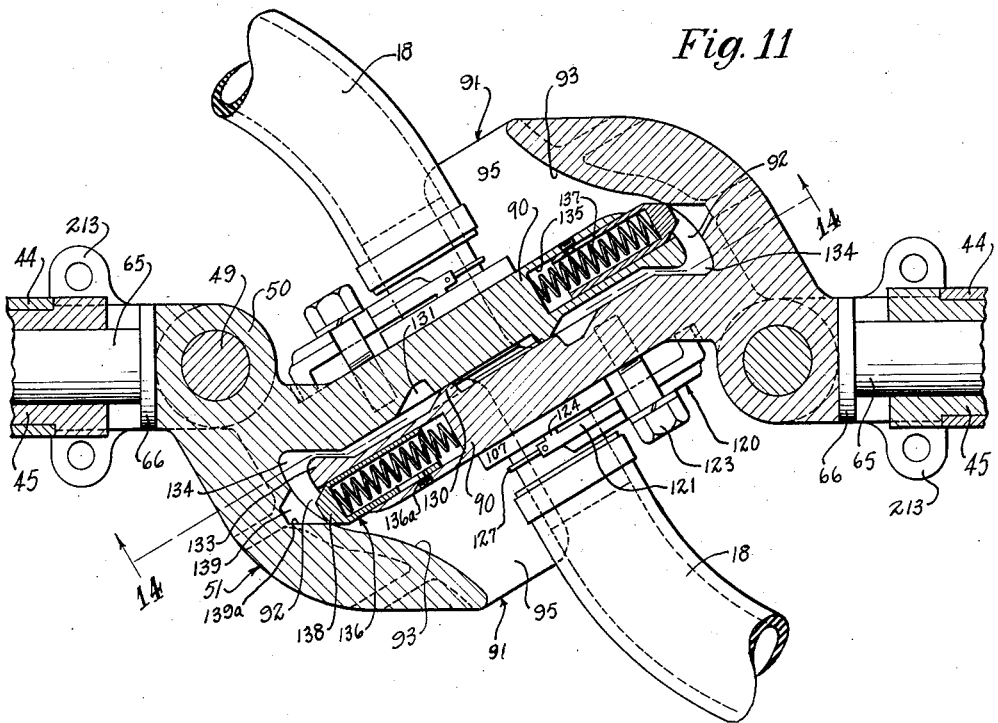

Feb. 7, 1933. A. S. JOHNSON 1,896,687
AUTOMATIC TRAIN PIPE CONNECTER
Filed July 19, 1930 13 Sheets-Sheet 8

Inventor
Albert S. Johnson.

Attorney.

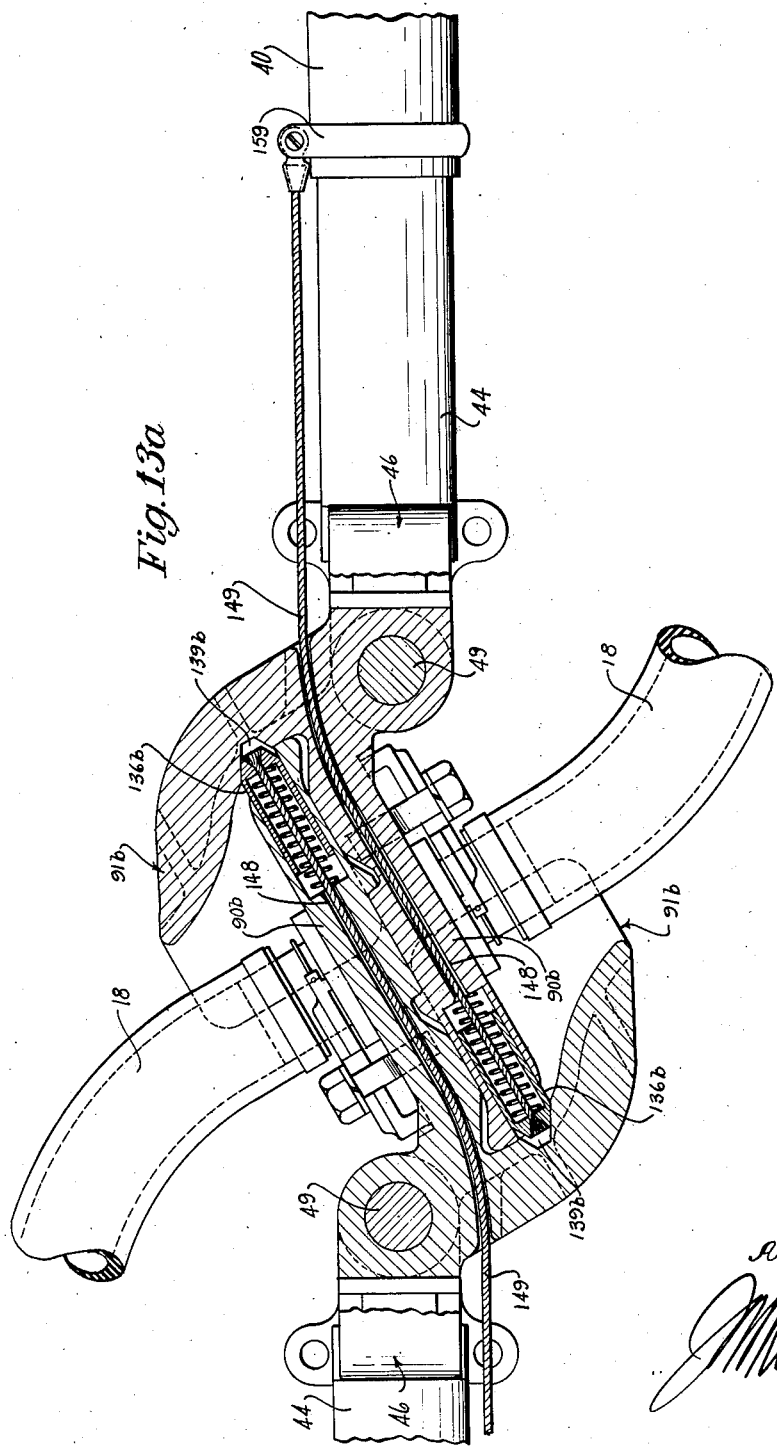

Feb. 7, 1933.     A. S. JOHNSON     1,896,687
AUTOMATIC TRAIN PIPE CONNECTER
Filed July 19, 1930     13 Sheets-Sheet 10
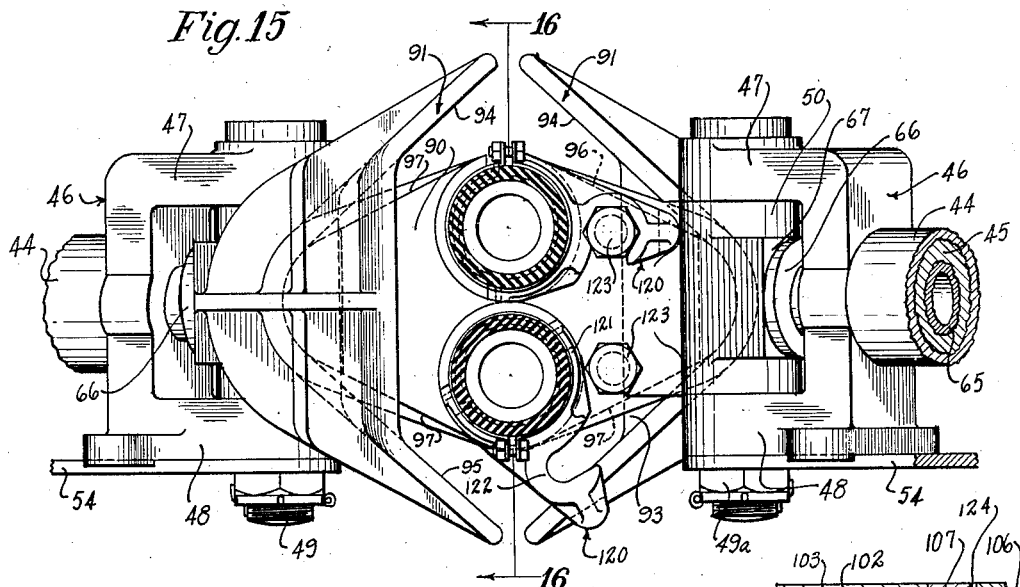
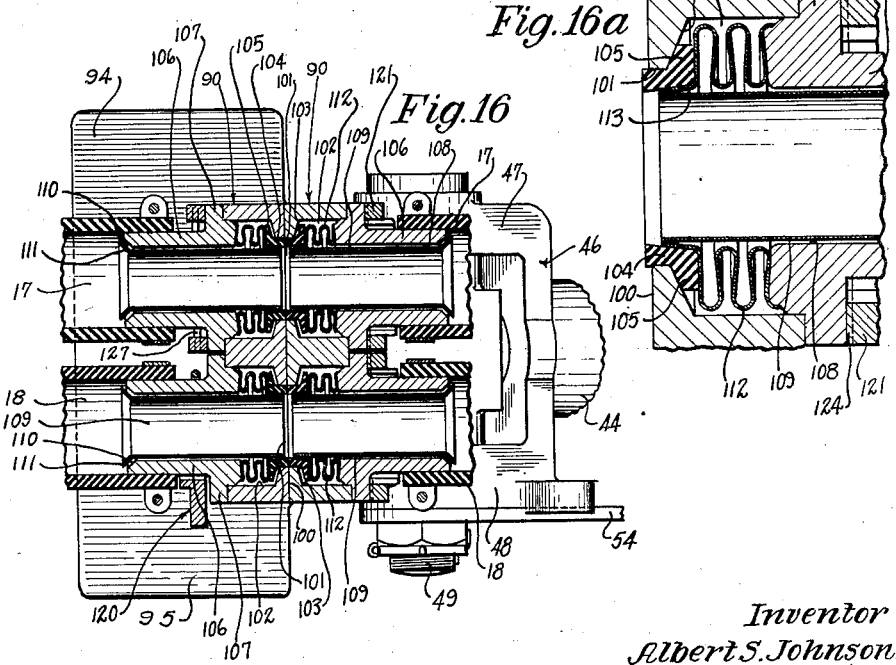
Inventor
Albert S. Johnson.
Attorney.

Feb. 7, 1933.  A. S. JOHNSON  1,896,687
AUTOMATIC TRAIN PIPE CONNECTER
Filed July 19, 1930  13 Sheets-Sheet 11
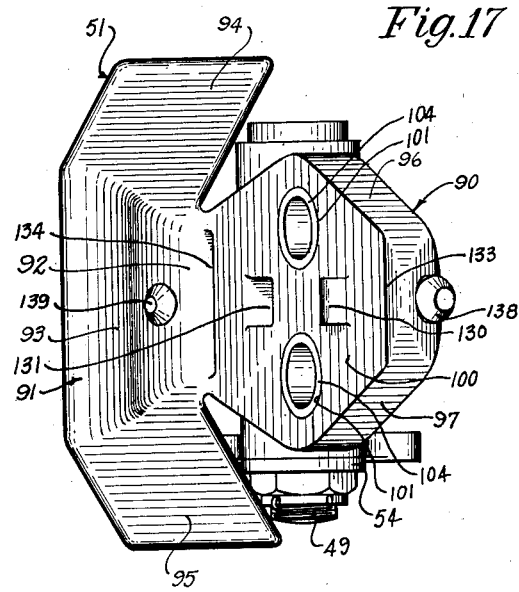
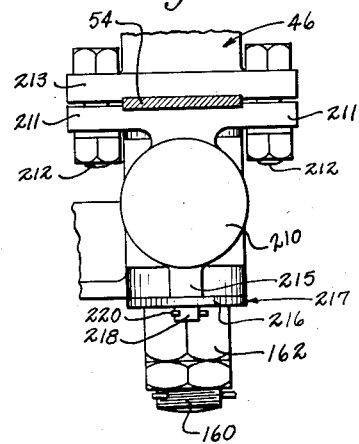
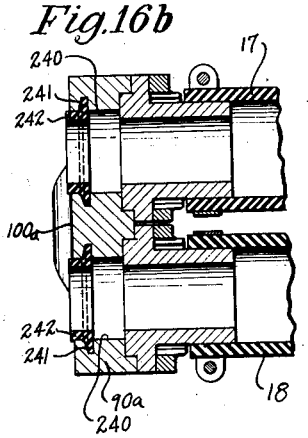
Inventor
Albert S. Johnson
Attorney.

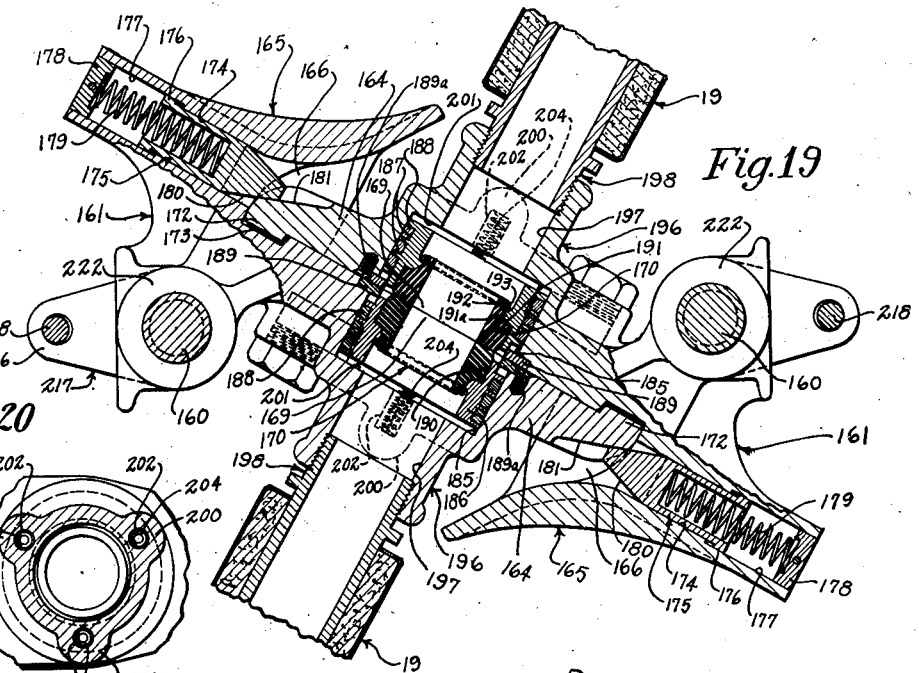

Patented Feb. 7, 1933

1,896,687

UNITED STATES PATENT OFFICE

ALBERT S. JOHNSON, OF LOS ANGELES, CALIFORNIA, ASSIGNOR TO JOHNSON CONNECTOR COMPANY, LTD., OF LOS ANGELES, CALIFORNIA, A CORPORATION OF CALIFORNIA

AUTOMATIC TRAIN PIPE CONNECTER

Application filed July 19, 1930. Serial No. 469,014.

This invention has reference to automatic couplers and particularly to automatic couplers for train pipes. The invention is designed primarily as an automatic train pipe coupler, and is hereinafter particularly described in the connection, but without limitation thereto, as certain features embodied in the invention have wider application.

There are a large number of rigorous and exacting requirements which an automatic train pipe coupler must fully meet in order to be worthy of reliance and use, as a failure of a train pipe coupling may result in most serious consequences. And because of the formidable number and the character of the difficulties encountered in the provision of a coupler capable of fully meeting these requirements, there has not to date been produced an automatic coupler which is considered to have sufficient merit for adoption as standard equipment on trains.

Some of these requirements and difficulties will here be briefly referred to. First, as to general arrangement, it is considered important that the train pipe coupler be installed as a part of the car body and not attached to or suspended from the draft gear, so that the two couplings are entirely independent of each other and characteristic actions of the draft coupling members will have no effect upon the train pipe coupler.

The connecter must be designed so as to absorb or withstand the severe shocks received in coupling, and must be capable of uncoupling easily and without damage to the device as the cars are pulled apart. The coupling must not part, however, with the small relative longitudinal movements of the cars due to the usual slack provided for in the draft coupling. Further, the couplings must be so designed that the coupled pipe lines are held in fluid tight seal during such small relative longitudinal movements, and also during relative horizontal, vertical and twisting movements due to the coupled cars passing around curves or over uneven tracks.

The train pipe connecter must have sufficient gathering range to insure coupling under all conditions in which the draft coupling will couple, and must be so designed that under conditions of the most extreme difference in relative positions between the connecter jaws of two uncoupled cars the pipe openings will be brought to and locked in positive alinement.

A general object of the present invention is to provide a coupling that successfully meets all of the above enumerated requirements, and which is simple in construction, reliable in service, and durable and free from trouble or necessity of frequent repair.

The manner in which my connecter accomplishes these and other objects not specifically mentioned, will best be left without further preliminary discussion to be gathered from the following detailed description of a present preferred embodiment of the invention, reference for this purpose being had to the accompanying drawings, in which:

Fig. 2 is a plan of the train pipe connecter, the steam pipe connecting parts being removed;

Fig. 3 is an elevation of the device shown in Fig. 2;

Fig. 4 is a vertical longitudinal section taken on line 4—4 of Fig. 2, the device being shown, however, in uncoupled position;

Fig. 5 is a view similar to Fig. 4, parts of the suspension members being broken away, and the device being shown in contracted position;

Fig. 6 is a view similar to Fig. 5 but showing the device in coupled position;

Fig. 7 is a view similar to Fig. 4 but showing the device in extended position;

Fig. 11 is a horizontal medial section of the coupling heads showing the device in a position during coupling;

Fig. 13a is a view similar to Fig. 13 but showing a variational embodiment which may be used in my device;

Fig. 14 is a view taken as indicated by the broken line 14—14 of Fig. 11;

Fig. 15 is a view taken as indicated by the broken line 15—15 of Fig. 13;

Fig. 16 is a vertical section taken as indicated on line 16—16 of Fig. 15;

Fig. 16a is an enlargement of certain portions of Fig. 16;

Fig. 16b is a view similar to a portion of Fig. 16, but showing a variational embodiment which may be used in my device;

Fig. 17 is a view looking into the open end of a coupler jaw;

Fig. 18a is a view taken as indicated by line 18a—18a of Fig. 18;

Fig. 19 is a horizontal medial section of the steam pipe connecter parts, the device being shown in coupled position;

Fig. 20 is a section taken on line 20—20 of Fig. 21;

Fig. 21 is a plan of the steam pipe connecter, the parts being shown in a position during coupling; and Fig. 22 is a section taken on line 22—22 of Fig. 18.

Figure 1:
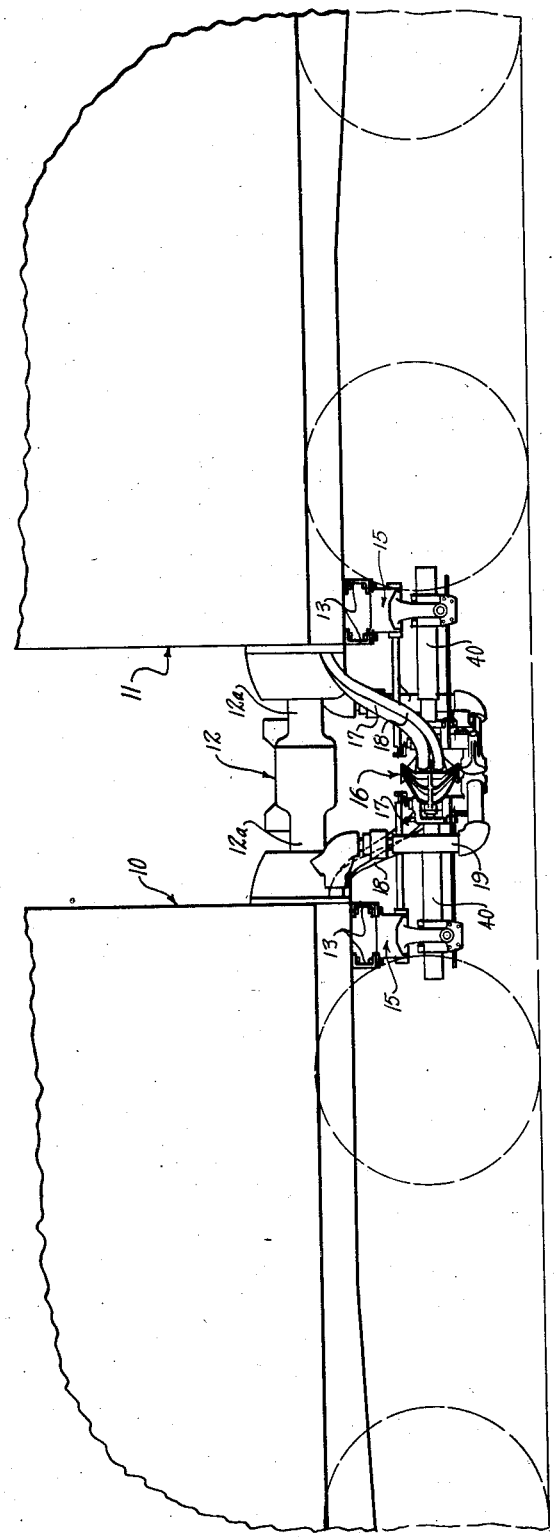
Fig. 1 is a more or less diagrammatic illustration of a pair of coupled cars showing the application of my automatic train pipe connecter thereto.

In Fig. 1 of the drawings numerals 10 and 11 designate diagrammatically a pair of car bodies coupled by a usual draft coupling 12, the interlocking heads of which are mounted on draw bars 12a. It will be understood that the draw bars and coupler heads are provided with such gathering range as will assure coupling within all possible variations of position, including relative lateral, vertical and rotative displacements of the coupler heads. The under structure of each car is shown to include transverse channels 13 to which are affixed the suspension members 15 of my train pipe connecter, generally designated at 16. The suspension members of the connecter may, of course, be applied to the under structure of the cars or draft gear in any other manner found suitable. The signal and brake air lines 17 and 18 and the steam pipe 19 are shown extending from the ends of the cars and coupled by the connecter 16. It is usual practice to arrange the pipes so that the signal and brake air lines extend from one side and the steam pipe from the other side of the car ends. The connecter is therefore arranged for the signal and air brake lines to cross in one direction and the steam pipe to cross in the other direction in passing from car to car, as indicated in Fig. 1.

In certain classes of service the train is not provided with a steam pipe, and my connecter is so arranged that in such situations the steam pipe connecting provisions can be omitted, and the connecter is so shown in Figs. 2 to 17.

The suspension and mounting of the connecter is shown best in Figs. 2 to 9 inclusive, to which reference is now had. Affixed to the frame members 13 of each car, as by bolts 20, is a suspension frame 21, comprising downwardly converging side walls 23 and end walls 24, upon which are formed tubular bosses 25 carrying a horizontal pin 26 that extends longitudinally of the car body. Pin 26 is held from rotation in bosses 25 by means of fastening pins 27.

Figure 8:
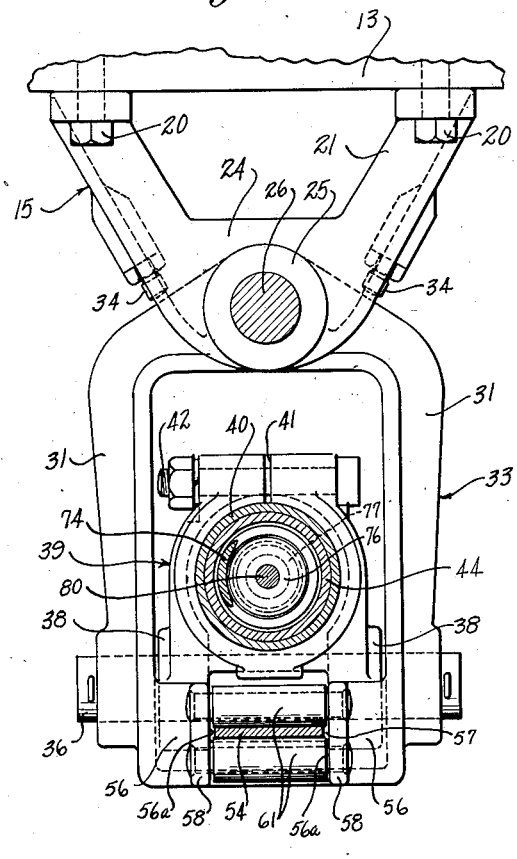
Fig. 8 is a vertical transverse section taken on line 8—8 of Fig. 7.
Figure 9:
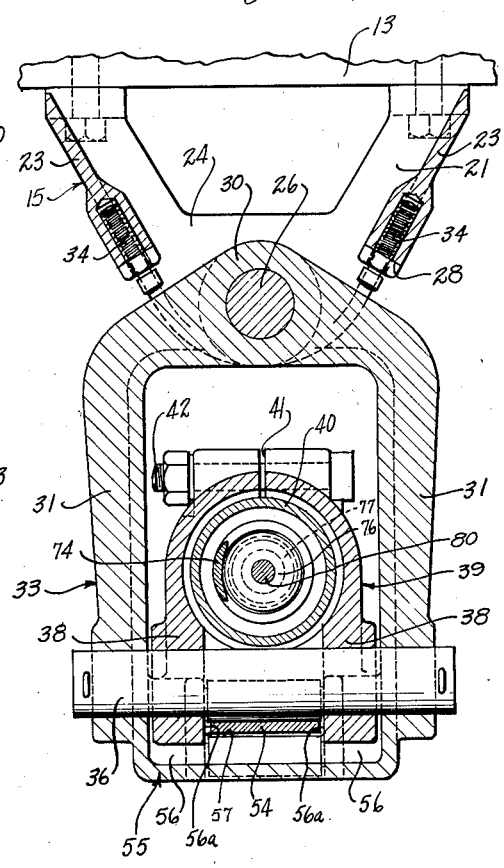
Fig. 9 is a vertical transverse section taken on line 9—9 of Fig. 7.
Figure 10:
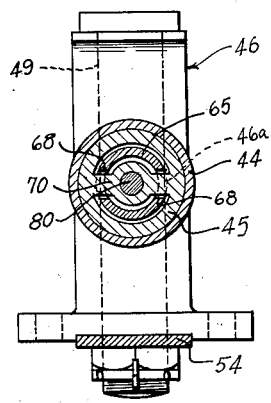
Fig. 10 is a vertical transverse section taken on line 10—10 of Fig. 7.

The lower portion of side walls 23 of frame 21 are cut out, as indicated at 28, so that the underside of frame 21 between bosses 25 is open, and taken in this opening in the under side of frame 21 and rotatably mounted on pin 26 is a bearing 30, from which depends the two laterally spaced arms 31 of a yoke, generally indicated by the numeral 33 (Figs. 8 and 9). Yoke 33 is thus mounted for swinging movement on an axis extending longitudinally of the car length. Such swinging movement of the yoke is limited, however, by engagement of its arms 31 with adjustable stop screws 34 carried by the side walls 23 of the suspension frame. Arms 31 of yoke 33 carry between their lower ends a laterally extending horizontal pivot pin 36, and mounted for pivotal movement on this pin between arms 31 is the bearing 38 of a cradle 39 for the coupler members.

This cradle 39 carries above pivot pin 36 a longitudinal tube or cylinder 40, the cradle fitting around the tube and being longitudinally split along its upper side, as at 41, and being provided with clamping bolts 42 adapted to be set up to clamp the tube tightly in place.

Telescopically slidable within the tube or cylinder member 40 is a plunger member in the form of a tube 44. This plunger tube 44 has fitted within its forward end the tubular boss or arm 45 of a head 46 in the form of a yoke providing upper and lower yoke arms 47 and 48, respectively. Yoke arms 47 and 48 carry a vertical, headed pivot pin 49, on the lower end of which is screw threaded a nut 49a, and pivoted on pin 49 between yoke arms 47 and 48 is the bearing part 50 of the connecter head or jaw, generally designated by the numeral 51 (see Figs. 2 and 3).

It will be noted that the cradle 39, the telescoping tubes 40 and 44, and the yoke 46 and coupler head carried thereby, are pivoted as a unit on the axis of the transverse pivot pin 36, and resilient means, now to be described, are provided for yieldingly resisting such movement. For this purpose I provide, in my preferred embodiment, a flat supporting-spring 54, the forward end of which is applied to the yoke 46 by inserting it between the lower yoke arm 48 and the nut 49a on pin 49, and the rear end of which is applied, in effect, to the car frame or body. For this purpose, the arms 31 of yoke 33 are integrally connected below pivot pin 36 by a channel shaped web 55, and the side walls 56 of this web are cut out, as at 57, to pass the spring 54. Each wall 56 is provided with a pair of spaced lugs 58 on each side of spring 54, and between these lugs 58 are carried upper and lower laterally extending rods 60 having spring engaging rollers 61, one above and one below the spring, as clearly shown in the drawings. It will be understood how the lower forward roller and the upper rearward roller cooperate to hold the rear end of the spring stationary when the foward end of the spring and parts supported thereby tend to move downwardly, and how the upper forward roller and the lower rearward roller cooperate to hold the rear end of the spring stationary when the forward end of the spring and parts supported thereby tend to move upwardly. The last mentioned pair can be omitted as gravity can be depended upon to oppose upward movement of the supported parts. Movement of the coupler about the horizontal transverse axis thus flexes spring 54 and is yieldingly resisted thereby. It will be noted that the spring 54 is arranged to slide between its supporting rollers during telescopic movement of tubes 40 and 44, and thus, at all relative positions of tubes 40 and 44, the coupler head is resiliently or yieldingly supported against vertical movement by a spring member which is supported by the cradle frame 31, and, as regards tipping movement about an axis transverse of the car body, which is, in effect, applied to the car body itself. Various other means which may be characterized as being applied, in effect, to the car body, and adapted yieldingly to support the coupler head against movement about a horizontal transverse axis, will occur to those skilled in the art, and all such variations are included within the scope of my broader claims.

Spring 54 preferably has but small lateral clearance with the vertical edges 56a of walls 56, as clearly shown in Figs. 8 and 9 and is therefore held against lateral movement in yoke 33. The spring 54 therefore acts in torsion to prevent excessive rotation of the coupler head and its supporting tube 44 within the mounting tube 40 carried by the cradle. At the same time, this arrangement allows some slight rotation of the coupling heads about the longitudinal axis of tube 40, to provide for any slight alinement necessary to make the interengaging faces of the couplings seat properly as the heads come together.

The boss 45 of the yoke 46 has an axial bore 46a, and longitudinally slidable therein is a tubular buffer member 65 having on its forward end a buffer head 66. Buffer head 66 is adapted to engage a flat face 67 on the rearward end of the coupler-head bearing 50. The rearward end of buffer member 65 is slotted, as at 68 (see Fig. 10), to pass a lug 70 formed integral with boss 45 and extending across the rear end of its tubular bore 46a, the rear end of the buffer projecting a short distance beyond the rear end of tubular boss 45, as clearly shown in the drawings. A washer 72 is provided adjacent the rear end of buffer 65, and confined between washer 72 and a head 73 welded in the rear end of tube 40 is a compression spring 74. This spring 74 serves yieldingly to oppose contractive telescopic movement of tubes 40 and 44, and also presses the buffer head 66 into yielding engagement with the flat face 67 of the coupler head bearing 50 to resist pivotal movement of the head on its pivot pin 49 and also return the head to center position when displaced therefrom.

The head 73 in the rear end of the tube 40 carries a tube 75 that projects through the spring 74, the forward end of this tube having an internal annular flange 76, which confines a compression spring 77, whose other end engages a washer 78 mounted against the head 79 of a tension rod 80 that extends forwardly through flange 76 and through a bore in lug 70 to a point forwardly thereof, and screw-threaded on the forward end of rod 80 is a nut 81 that is adapted to engage lug 70. Spring 77 abuts against flange 76 and acts through rod 80 and yoke-head 46 to oppose expansive forward telescopic movement of tube 44 in tube 40.

Spring 74 is made of such strength relative to the strength of spring 77 that when the coupler is in uncoupled position (Fig. 4) the spring 74 is in nearly fully extended position, while the spring 77 is in that position slightly compressed. The purpose and functioning of these springs and the telescopic movements of the tubes may be discussed to better advantage, however, at a later point in the specification.

The connecter heads or jaws 51 for the air pipe are shown best in Figs. 11 to 17, inclusive, to which attention is now directed. Each head or jaw 51 has, formed integrally with the bearing part 50, a body in the form of a tongue 90 and a part 91 forming a flaring guide mouth terminating rearwardly in a contracted throat 92, the guide mouth and throat of each jaw being adapted to receive the tongue of the other jaw. The vertical plane of the tongue 90 of each head is disposed at an oblique angle, as shown, so as to be normal to the direction of the air pipes which cross from side to side in passing between cars. The guide mouth formed by the part 91 is defined by converging side, upper and lower walls 93, 94 and 95, respectively, all meeting to form the contracted throat 92 at the base of the tongue.

The tongue of each element is adapted to enter the guide mouth of the other element as the cars are moved together, the guide mouth being widely flared so that the tongues will enter properly within wide limits of divergence of alinement of the opposing heads. Each tongue is formed with converging upper and lower surfaces 96 and 97, respectively, which are adapted to ride and be guided down or up by the slanting walls 94 and 95 of the guide mouth into proper elevation for connection, while the side wall 93 of the mouth gathers the tongue laterally into position for connection.

Figure 12:
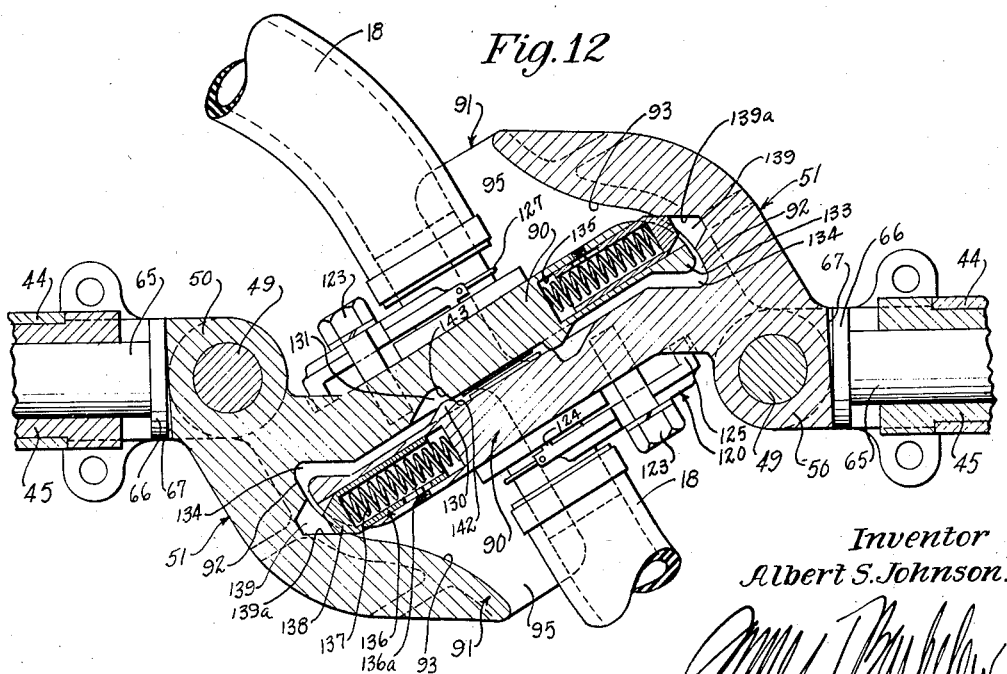
Fig. 12 is a view similar to Fig. 11 but showing the device in a following position in the operation of coupling.
Figure 18:
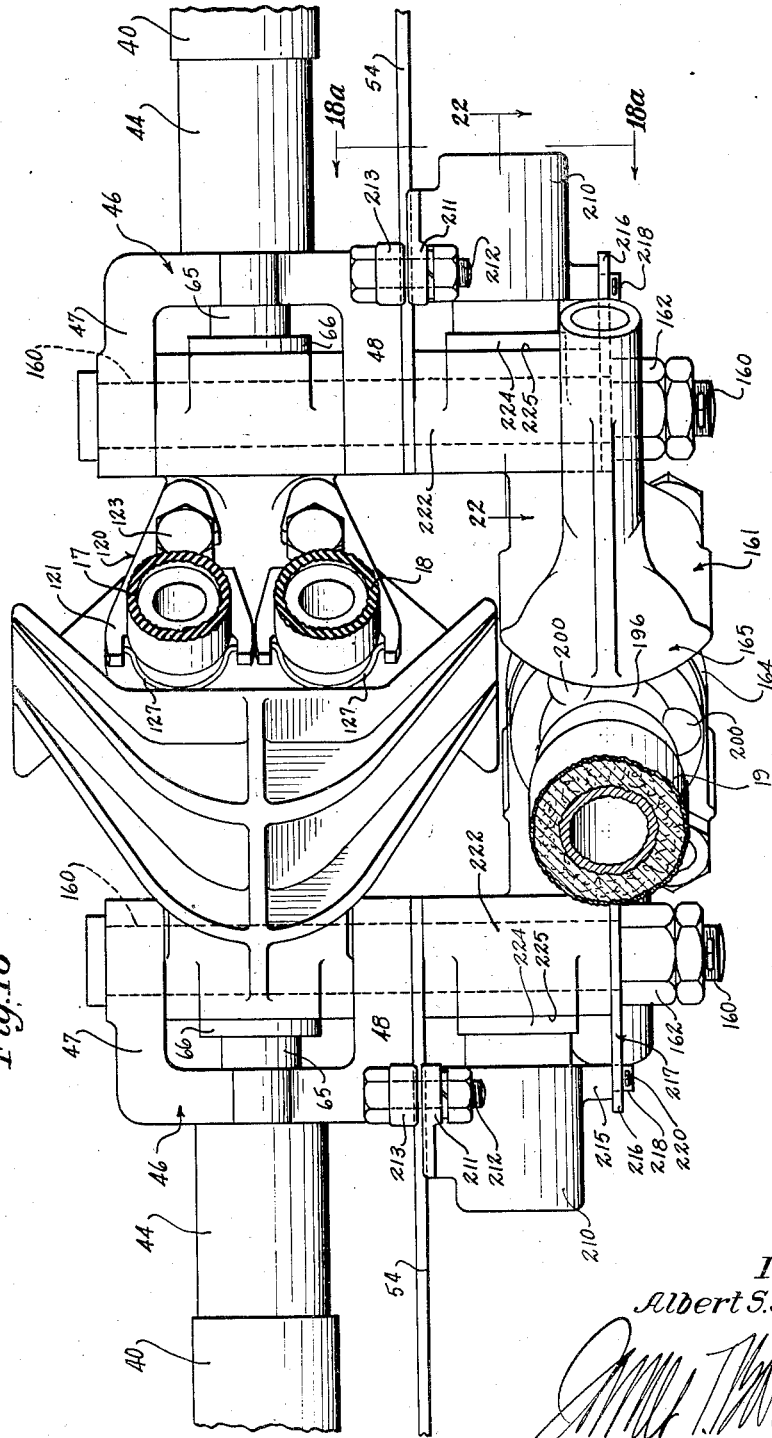
Fig. 18 is a side elevation showing the application of steam pipe connecter provisions to my device.

The inner surface of each tongue has a vertical contact face 100, to which open vertically alined air ports 101, two such ports here being shown. Counter bores 102 coaxial with but larger than the bores or ports 101, extend into the tongues from their outer surfaces, and conical seating surfaces 103 are formed between bores 101 and 102. A gasket 104 of suitable material, preferably resilient, fits in each port and normally projects outwardly beyond the contact face 100, as indicated in Figs. 11 and 12. The gasket has an external annular flange portion 105 having a conical surface opposed to and adapted to seat on the conical seating surface 103, previously referred to.

The air hoses 17 and 18 are clamped over hose spuds 106, the forward ends of which are removably taken within the bores 102, the spuds being provided with annular flanges 107 which shoulder up against the outer faces of the tongues 90. Spuds 106 have tubular bores 108 of the diameter of the opening through the gasket, and passing through the bore 108 of each spud is a tube 109 projecting into the gasket nearly to the outer end thereof, there being provided an air-passing clearance between the tube 109 and the spud, as shown clearly in Fig. 16. The bore 108 of spud 106 terminates at its outer end in a conical seating surface 110, and the tube 109 is conically flanged at 111 to seat therein. Provided in the bore 102 between the gasket and the adjacent end of the hose spud 106 is a resilient diaphragm 112 comprising a corrugated tube. This diaphragm, which is resiliently contractible in the direction of its longitudinal axis, is soldered or brazed at one end to the inner end of the hose spud, and has at its outer end a conical portion 113 fitted within a corresponding internal conical surface of the gasket, the outer end portion 113 being soldered to the adjacent end of the metal tube 109. Spud 106 and tube 109 are thus connected by this resilient diaphragm 112, and tube 109 is longitudinally movable with reference to the spud within the limits permitted by the flexibility of the diaphragm. The spuds being in position, as the coupler heads are closed the opposing projecting gaskets engage and force each other inwardly as the contact faces 100 of the tongues move together, the effect being that the gaskets are moved against the resilient diaphragm 112 and are unseated from the conical surfaces 103, as shown in Fig. 16. This movement causes the tubes 109 connected to the flexible diaphragms to be moved rearwardly in the spud bores 108 and their flanges 111 to be unseated from the conical seats 110. When air under pressure is subsequently admitted to the line, it passes through this clearance space between tube 109 and the inner surface of the spud bore to the space within the flexible diaphragm and acts to force the diaphragm against the gasket, thereby providing fluid tight seal between the gasket and the diaphragm, and also acts through differential of pressure to press the gasket outwardly against the opposing gasket to make further effective the seal between the two gaskets.

The resilient diaphragm thus acts, first, as a sealing member to prevent leakage around the outside of the gasket, second, as a pressure element to apply air pressure force to the gaskets facing toward each other when coupling, and third, as a spring normally pressing forward and thus holding the gaskets forward when air pressure is applied.

Although I preferably provide the seal 110, 111 at the rear end of the tube 109 to seal off air pressure from the expansive diaphragm when the coupling head is not engaged, such provision is not necessary and if omitted the fluid passage leading to within the expansive diaphragm would at all times be open.

Fig. 16b shows how my coupler jaws may be adapted for the use of standard gaskets. As there shown, the tongue or body part 90a has air passages 240 within which are grooves 241 adapted to receive the gaskets 242, which are of usual standard form. The gaskets are shown projecting out a proper distance beyond the contact face 100a, where they are engaged by the projecting gaskets of the opposed jaw as the coupling is made.

For the purpose of holding the spuds in position, there are provided clamp members 120 each comprising a yoke 121 extending around its spud behind the flange 107, and having a hook portion 122 adapted to fit around and below the head of a clamping screw 123 set into tongue 90. The ends of the arms of yoke 121 have lugs 124 engageable with the flange 107 of the spud, and the outer end of hook 122 has a lug 125 engageable with the outer face of the tongue 90 when the spud is inserted in the bore 102. To clamp the spud in connected position, the hook 122 of the clamp is put over the screw 123, which is then set up tightly to force the lug 125 into tight engagement with the outer face of the tongue, and the lug 124 into tight engagement with spud flange 107. To unclamp the spud, screw 123 is loosened and the clamp unhooked therefrom (see the lower clamp in Fig. 15), when the entire assembly of spud, flexible diaphragm and tube 109 can be removed for free access to the gasket. To retain the clamp 120 on the spud when disconnected from the tongue, the yoke arms 121 are connected around the other side of the spud by a spring wire 127. The spuds being thus disconnected, the gasket 104 may be removed from the rear, and all this can be done while the coupler heads are connected.

It is understood that when inactive the gaskets 104 project beyond the contact faces 100 of the tongues 90. Means are therefore provided whereby these gaskets are protected from being rubbed by the opposing tongue and gasket during coupling, and whereby the opposing gaskets come substantially straight toward each other for final engagement. For this purpose, the contact face 100 of each tongue is provided with a lug 130 that projects outwardly at least twice as far as the gasket projects, this lug being adapted to ride over the contact face of the other tongue as the heads are moved together, and finally, when the gaskets are in substantial alinement, to be taken in a pocket 131 provided in the contact face of the other tongue to allow the opposed contact faces to come together. As a further provision, the tip of each tongue is preferably formed with a projecting lug 133 adapted for engagement with the contact face 100, this lug engaging and riding on the face 100 only, however, in certain situations where the contact heads are not in alinement. Lug 133 is finally received within a pocket 134 at the base of the opposing tongue, as the connection is completed.

Figure 13:
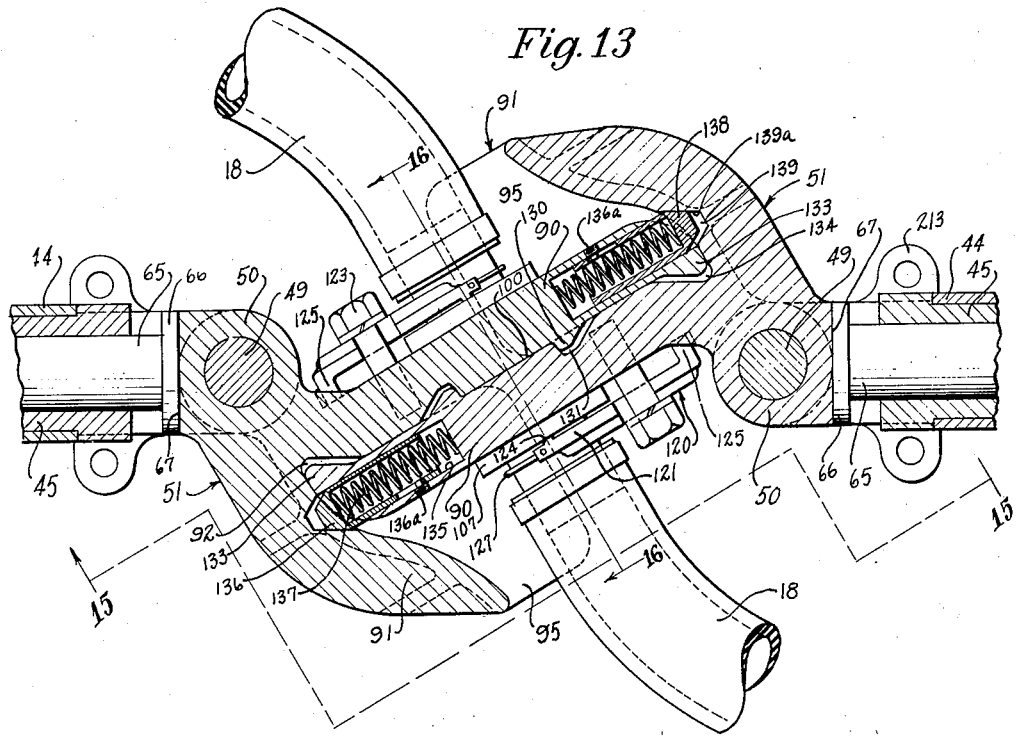
Fig. 13 is a view similar to Figs. 11 and 12 but showing the device fully coupled.

In the embodiment here illustrated the ends of the tongues are provided with longitudinal bores 135 within which work locking plungers 136, compression springs 137 being provided to hold the plungers normally in extended position, as shown in Fig. 11. These plungers are provided with beveled noses 138, which are adapted to be finally taken within correspondingly shaped plunger seats or pockets 139 provided in the throats to lock the heads together, as illustrated in Fig. 13. The plungers may be confined within their bores by means of screws 136a carried by the tongue and projecting with longitudinal slots in the plungers.

Fig. 11 shows the heads in a position during coupling, the heads being shown in such a position that the tips of the plungers 136 have just engaged the side walls 93 of the mouth. The lugs 130 are riding on the contact faces 100, and the projecting gaskets 104 are still separated.

Fig. 12 shows a position following that of Fig. 11, the gaskets here being nearly alined, and the lugs 130 being nearly in position to slip into the pockets 131, while the plungers 136 are retracted due to engagement with the throat defining walls. In this position the force exerted due to the engagement of lugs 130 with contact faces 100 causes each head to pivot somewhat on its vertical mounting pin 49, this movement being resisted by the spring pressed buffer head 66, previously referred to. Now the rearward side 142 of each lug 130 and the corresponding surface 143 of its pocket 131 are formed in planes nearly at right angles to the contact faces 100, so that when the heads have moved beyond the position of Fig. 12 to a point where the lugs are opposite and ready to slip into their pockets 131, the contact faces of the two tongues are free to move substantially straight toward each other, which they do aided by the force exerted by the spring pressed buffers which are acting on the heads because of the pivotal displacement given to the heads in passing through the position illustrated in Fig. 12. The opposing, projecting gaskets, which are then substantially in alinement, thereupon engage one another and are forced back into their ports as the contact faces meet (see Fig. 16). The contact faces of the two heads thus are held separated sufficiently to assure clearance of the gaskets until the gaskets are substantially alined, and transverse rubbing together of the gaskets is substantially eliminated.

When the heads have reached the position of Fig. 13, the outer ends of the lugs 133 on the two tongues are in snug engagement with the walls defining the pockets 134 and the outer ends of the tongues are in engagement with the walls defining the throats 92, while the rear faces 142 of lugs 130 are tight against the walls 143 of their pockets, and it will be seen that these provisions hold the tongues against relative longitudinal movement until they have separated sufficiently to clear the lugs. And as the tongues thus reach the closed position of Fig. 13, the locking plungers 136 are alined with the pockets or plunger seats 139 and are extended by the springs 137 whereby their beveled tips 138 are inserted therein. The angle between the engaging faces 139a of pockets 138 and the diagonal engaging faces 100 of the coupler heads is sufficiently small that friction between surfaces 139a and the plunger tips prevents forces normal to faces 100 (exerted by pressure in the air pipes or other causes) from causing retraction of the plungers and unlocking of the heads. However, these angles, and the force of the plunger springs, are also such that the separative force exerted between the coupler heads as the cars are pulled apart causes the plungers to retract to allow the tongues to separate.

Fig. 13a is a view similar to Fig. 13 but showing means for positively retracting the locking plungers when the coupler heads are separated. As there shown the tongues are provided with longitudinal passage ways 148 for cables 149, or other connection, attached at one end to the plungers and at the other end to clamps 159 fastened on the tube 40. Sufficient slack is left in cables 149 that small longitudinal movements between the coupler heads and the tubes 40 will not tighten the cables sufficiently to retract the plungers, but when the cars are pulled apart the relative movements between the coupler heads and tubes 40 are sufficient to take up the slack in cables 149 and to retract the locking plungers sufficiently that the heads may easily separate.

Fig. 4 shows the telescoping tubes 40 and 44 and springs 74 and 77 in the uncoupled position. The springs 74 and 77 are arranged in opposition to one another, and are of such relative strengths that spring 74 is in this position nearly fully extended, while the spring 77 is under some compression. As the coupler faces are moved together the yokes 46 upon which the jaws are mounted, and the tubes 44 supporting the yokes, are moved rearwardly against springs 74. Fig. 5 shows the limit of such rearward movement, the plunger tube 44 being fully retracted within the cylinder tube 40.

Fig. 6 shows a normal coupled position, the spring 74 being under some compression due to retraction of tube 44 within tube 40, and the force of this spring acting through buffer 65 both to move and press the coupler jaws together, and to resist pivotal movement of the jaws on pins 49. It is to be noted that in this position the interlocked coupler jaws, yoke heads 46 and supporting tubes 44 are quite a distance rearward of their inactive position (Fig. 4) and are therefore longitudinally movable both forward and rearwardly as a unit with reference to the cars and cradle frames suspended therefrom, being connected to the cradle frames for longitudinal movement thereby only through the opposed cushion springs 74 and 77. Therefore small relative longitudinal movements of the cars as slack comes into or is taken out of the draft connection is taken up by these springs. Thus, the parts being in the coupled position of Fig. 6, as a small relative separative movement of the cars and connecter jaws takes place the cylinder tubes 40 are moved rearwardly on the plunger tubes 44, being aided in such movement by springs 74. And as the cars come together the reverse takes place. But such movements are not sufficient to cause the locking plungers to retract and release the connecter jaws.

The general position, longitudinally, taken by the coupler parts when active is of course controlled by the general relative positions of the car bodies when the draft couplings are engaged; and it will be understood that my coupler is positioned on the car bodies so that the engaged draft couplings will hold my couplings in the positions described.

In Fig. 7 is shown the position of the parts as the coupler jaws are pulled apart when the draft coupling is disconnected. Tube 44 is here pulled forwardly from the normal coupled position of Fig. 6, this movement having taken place against spring 77, which is compressed against the flange 76 of tube 75 by the head of tension rod 80, which is moved forwardly by engagement of the lug 70 of the yoke-head with the nut 81 on its forward end, as will be understood. Fig. 7 shows the limiting position of such movement, spring 77 having been compressed until its coils touch and accordingly positively stop further forward movement of the tension rod. At some point before reaching this position the force exerted by the compressed springs 77 is sufficient to cause the locking plungers to retract and release the jaws, and since the springs 74 in this position are fully expanded, their force exerted to resist pivotal movement of the jaws on the pins 49 is removed, and the jaws move easily to unlock. Fig. 7 also illustrates the possible limiting extension of the tubes imposed as the cars travel around curves, it being required in all cases that sufficient extensive movement of this kind be provided to take care of the sharpest curves which will be encountered in practice. However in all ordinary cases the extension of the engaged couplings will probably be less than that of Fig. 4—the normal uncoupled position.

The universal mountings of the coupler heads permit them to couple properly under all conditions. For instance, the jaws are permitted to be gathered together from vertically displaced positions by virtue of their swinging vertically on the horizontal transverse pivots 36 provided for the couplers, and are permitted to be gathered from horizontally displaced positions by virtue of their swinging below the horizontal longitudinal pivots 26 of the couplers. When the couplers swing on the horizontal longitudinal pivots 26 to one side of normal position in coupling, however, the tubes 44 may have a small rotation within tubes 40 as the contact faces 100 of the heads are moved into engagement, this rotative movement being allowed but torsionally resisted by the flat spring 54, as previously described. This rotative or twisting movement takes care of any non-parallelism of the coupling heads as seen in vertical transverse section. And the vertical pivots 49 take care of any non-parallelism as seen in horizontal longitudinal section. The capability for these various adjusting movements thus enables the couplers to accommodate themselves from all possible conditions of non-alinement.

Preferably, means may be provided for rigidly supporting the coupler head when in uncoupled position. For this purpose, the longitudinally extending pivot pin 26 may be extended forwardly over the yoke 46, as shown in Figs. 1, 2, 3, 4 and 7. Pivoted on a projection 150 of this pin 26 is an arm 151, the lower end of which has a hook or finger 152 extending rearwardly to engage an eye 153 formed on yoke 46. The upper end of the arm is engaged by a spring pressed plunger 156 mounted in the forward end of pin 26. When the coupler is in normal uncoupled position the eye 153 is thrust over the hook 152 (Fig. 4), and the coupler head is held by this hook against vertical swinging movement. In coupled position, the heads are moved rearwardly from the position of Fig. 4 and the eyes 153 are therefore removed from their supporting hooks, as shown in Fig. 3. The hook is made of sufficient length to provide for the forward movement of the eye 153 when the parts are moved to the fully expanded position shown in Fig. 7.

The device as so far described provides for the connection of the air lines but not for a steam line, being in this form adapted for use on freight trains or in other situations where no steam pipes are provided. And although the connecter as here shown is adapted for the usual situation in which the two air lines are used, one for brake air and one for signal air, it will be understood how more or less air lines may be provided and also how one of the lines may be used as a conduit for an electrical circuit or for other things. My invention is not limited as to the uses to which it may be put.

In Figs. 18 to 22 is shown how a steam pipe connecter may be applied to the device. For this purpose the vertical pivot pins 49 on which the air line connecter jaws are pivoted are replaced with longer pins 160 which depend below yokes 46, and on the depending extensions of these pins 160 are pivoted the steam connecter jaws or heads 161, the pins being screw-threaded on their lower ends and nuts 162 being provided thereon for support of the jaws. The jaws or heads shown for connection of the steam pipe are here shown of different design from those shown for connection of the air lines, but it will be understood that either type may be used in either situation. Each steam head 161 includes a tongue 164 and a part 165 forming a flaring guide mouth terminating rearwardly in a contracted throat 166, which is adapted to receive the tongue of the other head. The obliquity of the plane of tongues 164 is made opposite to that of the tongues of the air line connecter head, for the reason that the steam pipes on trains are ordinarily on the opposite sides of the cars from the air lines and the steam and air lines therefore cross at the central point of the connecter heads. For this reason the steam heads and the air heads swing oppositely, relatively in coupling; and so, the steam heads are loosely mounted on the vertical pivots 160, or the air heads are so mounted, so that the two heads are not rotatively locked together.

The inner surface of each tongue 164 has a vertical contact face 168, to which opens a steam port 169 having a projecting gasket 170, hereinafter more particularly described.

The tip of each tongue 164 has on its inner surface a lug 172 that projects outwardly at least as far as twice the distance the gasket 170 projects out, and that is adapted to be received in a pocket 173 in the throat of the other head as the heads are finally closed (Fig. 19). The throat of each head is provided with a bore 174 within which works a locking plunger 175, the rear end of the plunger having an enlarged head 176 which works in an enlarged counter bore 177 to the rear of bore 174, engagement of head 176 with the shoulder provided between bore 174 and counter bore 177 limiting forward extension of the plunger. The rear end of bore 177 is closed by a head 178, and a compression spring 179 is provided forwardly of this head and extends into a pocket in the plunger 175, this spring tending to move the plunger to its fully extended position.

The tip of plunger 175 is beveled, as indicated at 180, and is adapted to slide over a correspondingly beveled surface 181 provided on the outer side of the tip of the opposing tongue 164 to lock the tongue in connected position (Fig. 19).

Fig. 21 shows the heads in a position during coupling, the ends of the tongues just engaging the ends of the locking plungers 175. The heads are shown coming together from a position of alinement, but if the heads are not alined the flaring guide mouths of both connecters will gather the tongues and guide them toward the contacted throat where the ends of the tongues will again engage the locking plungers. In Fig. 21 the lugs 172 are shown clearing the contact faces 168 of the tongues, but in certain cases of non-alinement of the heads these lugs rub on the contact faces 168 of the tongue and thus serve to hold the tongues sufficiently separated that the gaskets 170 cannot rub on one another during coupling.

The engagement of the tongues with the locking plungers causes the latter to be retracted against their springs until the tongues are in such position that the lugs 172 are directly opposite their pockets 173, whereupon the tongues are moved straight toward each other and the lugs are received in their respective pockets. At this time the plungers 175 are cleared and slip out and over the beveled end surface 181 of the tongues to lock the jaws together.

The sides of lugs 172 and their pockets 173 are formed nearly at right angles to the plane of the contact faces so that the contact faces of the tongues move substantially straight toward each other as the lugs enter their pockets, with the effect that transverse rubbing of the gaskets 170 is substantially eliminated.

Similarly to the locking arrangement provided for the air connecter jaws, the angle between the line of engagement of the beveled plunger tip with the beveled surface of the tongue, and the axis of the steam passage through the head, is sufficiently large that the friction between the engaging surfaces prevents the plunger from being retracted to release the tongue due to any separative force applied in the direction of the steam passage by the steam itself, but the angle is such that the relatively greater force exerted between the coupler heads as the cars are pulled apart causes the plungers to retract and permit the tongues to separate freely.

The steam ports 169 in the contact face of each tongue open from a bore 185 within which is carried a ring-shaped gasket holder 186. This gasket holder is formed about its periphery with annular grooves 187 carrying steam packing 188. A retaining ring 189 set flush into the face of the tongue and overlapping the bore 185 confines the gasket holder therein. The retaining ring is held in place by a machine screw 189a, which is removed when it is desired to take out the retaining ring and gasket holder. The gasket 170, previously referred, is inserted within the bore 190 of the gasket holder, within which is formed an internal annular flange 191 providing an inwardly converging conical surface 191a. The inner end of the gasket has a peripheral groove 192 which carries a split, resilient ring 193 of normal diameter just greater than the diameter of an opening through the conical faces of flange 191, and as the gasket is inserted in the holder the conical surface 191a contracts the ring to permit it to pass the flange, after which the ring expands to retain the gasket in the position shown.

Extending rearwardly from the tongue is a tubular part 196 drilled through with a bore 197 coaxial with but of lesser diameter than the bore 185 within which the gasket holder is carried, the outer end of bore 197 being internally screw-threaded to receive the steam pipe coupling tube 198.

The tubular portion 196 of each head is formed with spaced nubs 200 opposite the shoulder 201 formed between the bores 185 and 197, these nubs providing stock for bores 202 drilled in from shoulder 201 (Figs. 19 and 20). These bores 202 receive compression springs 204 which press against the adjacent end of the gasket holder, as shown in Fig. 19. The gasket holder has a limited longitudinal play in the bore 185, and these springs 204 act to press the gasket holder out toward engagement with the retaining ring 189, in which position the gasket 170 projects out beyond the contact face 168 of the tongue. When the device is coupled, however, the opposed gaskets 170 meet and are forced rearwardly, moving the gasket holders back against the springs 204 to the position shown in Fig. 19. Springs 204 thus serve to hold the gaskets in a position of projection when the device is uncoupled, and when the device is coupled the springs serve to press the two gaskets into tight engagement While I have shown no means for changing the steam gaskets while the cars are in coupled position, it will be understood that this can be accomplished in similar manner to that of the air lines, if desired, or in any other suitable manner.

It will be remembered that the steam heads are freely pivoted on the vertical pivot pins 160, and means are provided for yieldingly resisting pivotal movement of the heads from normal position. For this purpose there is provided a housing 210 having lugs 211 connected by screws 212 to lugs 213 formed on the lower arms of the yoke 46 that supports the pivot pin 160, the upper side of the housing engaging the spring 54, as shown in Fig. 18a. The lower side of this housing has a depending lug 215 that rests on a lateral extension 216 of a washer 217 confined on pin 160 between the lower end of the steam head and the nut 162, there being preferably provided a pin 218 extending from lug 215 down through an opening in the washer extension 216 and having a cotter key 220 through its lower end.

This housing has a cylindrical bore 221 open towards the bearing portion 222 of the head through which the pin 160 passes, and working telescopically in bore 221 is a plunger 223 having on its outer end a buffer head 224 that engages a flat face 225 provided on the head part 222. Plunger 223 is hollow, and a compression spring 226 is placed in the hollow plunger and housing to force the buffer head into pressural engagement with the flat face 225 of the head. Pivotal movement of the steam head on pins 160 during coupling or uncoupling, or during passing of the cars around a curve, is thus yieldingly resisted by these spring pressed buffers, and when the heads are rotatably displaced from their normal position on pivot pins 160 the spring pressed buffers act constantly to move them back to their normal position, whether coupled or for recoupling.

From the foregoing, it will be understood that the universal mounting of my coupler adapts it to couple and to bring the pipe lines to fluid tight seal under conditions of wide differences in relative position of opposed coupler jaws, including relative horizontal, vertical and rotational displacements. Further, when once coupled, the jaws are securely held in fluid tight seal during all ordinary conditions of horizontal, vertical and rotational differences in relative position of the car ends. The capability of the coupled jaws for longitudinal movement relative to the cars takes care of the relative longitudinal movements of the coupled cars as slack comes into or is taken out of the train, and also provides for the extension required in passing around curves. And this longitudinal movement relative to the cars, resisted by cushioning springs, serves to absorb shocks as the cars are coupled or uncoupled. The foregoing, and in fact all I have said regarding operation and accommodation of the air heads applies equally well to both steam and air heads. Although the mechanical design in detail is different, it will be readily recognized that the corresponding parts of the steam heads function in the same manners and to the same ends as those in the air heads.

It will be understood the drawings and description are to be considered merely as illustrative of and not restrictive on the broader claims appended hereto, for various changes in design, structure and arrangement may be made without departing from the spirit and scope of said claims.

I claim:—

1. In combination, a vehicle, a coupler extending in the direction of the vehicle length and embodying two parts arranged for horizontal telescopic movement, one of said parts being applied to said vehicle for vertical swinging movement about a horizontal axis which is transverse of the vehicle length, and means yieldingly holding said one part against such movement in one direction during telescopic movement of said parts, said means embodying a substantially horizontal flat spring applied to said other part and extending, in effect, into sliding engagement with the vehicle.

2. In combination, a vehicle, a coupler extending in the direction of the vehicle length and embodying two parts arranged for horizontal telescopic movement, one of said parts being applied to said vehicle for vertical swinging movement about a horizontal axis which is transverse of the vehicle length, and means yieldingly holding said one part against such movement in one direction during telescopic movement of said parts, said means embodying a substantially horizontal flat spring applied to said other part, and a pair of opposed, vertically spaced projections carried, in effect, by the vehicle, said spring extending from said other part slidably between said projection.

3. In combination, a vehicle, a coupler extending in the direction of the vehicle length and embodying two parts arranged for horizontal telescopic movement, one of said parts being applied to said vehicle for vertical swinging movement about a horizontal axis which is transverse of the vehicle length, and means yieldingly holding said one part against such movement in one direction during telescopic movement of said parts, said means embodying a substantially horizontal flat spring applied to said other part, and a pair of opposed, vertical spaced rollers carried, in effect, by the vehicle, said spring extending from said other part slidably between said rollers.

4. In combination, a vehicle, a coupler extending in the direction of the vehicle length and applied to said vehicle for movement about a horizontal axis which is transverse of the vehicle length and about a horizontal axis which is longitudinal of the vehicle length, resilient means limiting such coupler movement in one direction about said transverse axis, and adjustable means limiting such coupler movement about said longitudinal axis.

5. In combination, a vehicle, a coupler extending in the direction of the vehicle length and applied to said vehicle for horizontal swinging movement about a horizontal axis longitudinal of the vehicle, and for rotative adjustive movement about a longitudinal axis non-coincident with the longitudinal swinging axis, and yielding means limiting the last mentioned movement.

6. In combination, a vehicle, a coupler extending in the direction of the vehicle length and applied to said vehicle for vertical and horizontal transverse adjustive movements relative thereto, such coupler including a coupler head, and an intermediate mounting for the coupler head including a vertical pivot about which the coupler head swings horizontally and a longitudinal axis about which the head rotates in a vertical plane.

7. In combination, a vehicle, a coupler extending in the direction of the vehicle length and applied to said vehicle for vertical and horizontal transverse adjustive movements relative thereto, such coupler including a coupler head, and an intermediate mounting for the coupler head including a vertical pivot about which the coupler head swings horizontally and a longitudinal axis about which the head rotates in a vertical plane, and yielding means yieldingly opposing the several movements of the coupling.

8. In a coupler, a horizontal arm member having a longitudinally extending bore opening to one end thereof, a yoke carried by said one end of the arm, a jaw member mounted between the yoke arms for pivotal movement about a vertical axis and having a portion in horizontal alinement with the open end of the bore, a plunger mounted for longitudinal movement in said bore, a spring acting to urge said plunger through said bore into end engagement with said jaw, and there being cam elements between said plunger and jaw such that the spring urged plunger acts when the jaw is displaced in either direction from a center position to return the jaw to said center position.

9. In a coupler, a horizontal arm including two tubular parts connected for horizontal telescopic movement, a jaw mounted on one part for pivotal movement about a vertical axis in either direction from a center position, and a spring associated with the parts and jaw in a manner both to resist telescopic movement of the parts and to resist pivotal movement of the jaw from said center position, and to act when said head is displaced to return the head to center position.

10. In a device of the character described, a supporting body, a cradle suspended from said body for pivotal movement about a horizontal axis, a coupler arm supported in said cradle for movement about a horizontal axis which is at right angles with the first mentioned axis, and means acting directly between said arm and cradle yieldingly supporting said arm in a position of horizontal extension.

11. In a device of the character described, a supporting body, a cradle suspended from said body for pivotal movement about a horizontal axis, a coupler arm supported in said cradle for movement about a horizontal axis which is at right angles with the first mentioned axis, and means acting directly between said arm and cradle yieldingly supporting said arm in a position of horizontal extension.

12. In a coupler, a cylinder member and a plunger member associated for longitudinal telescopic movement, a relatively large diameter compression spring in the cylinder and acting against the plunger to resist telescopic contractive movement of said members, a relatively small diameter compression spring arranged within the bore of the larger spring, a relatively stationary abutment in the cylinder for one end of said smaller spring, and a tension rod extending from the other end of said smaller spring into engagement with said plunger to resist telescopic expansive movement of the members.

13. In a coupler, a cylinder member and a plunger member associated for longitudinal telescopic movement, a relatively large diameter compression spring in the cylinder and acting against the plunger to resist telescopic contractive movement of said members, a tube carried on one of the members and projecting through the bore of said spring, said tube having an internal annular flange, a relatively small diameter compression spring in the tube and with one end in engagement with said flange, and a tension rod adapted to engage, in effect, the other end of said spring and extending into engagement with the other member to resist yieldingly telescopic expansive movement of the members.

14. In a coupler, a cylinder member and a tubular plunger member associated for longitudinal telescopic movement, a tube carried by the cylinder within its bore and adapted to enter the plunger bore upon telescopic contractive movement of the members, said tube having an internal annular flange, a compression spring in the tube and with one end in engagement with said flange, and a tension rod adapted to engage, in effect, the other end of said spring and extending into engagement with the plunger to resist yieldingly expansive telescopic movement of said member.

15. In combination, a vehicle, a coupler extending horizontally in the direction of the vehicle length and embodying a cylinder member and a plunger member arranged for horizontal telescopic movement, one of said parts being applied to said vehicle for pivotal movement about a horizontal axis which is transverse of the vehicle length, and means adapted both to hold the cylinder and plunger against relative rotation and to yieldingly hold said one part against pivotal movement in one direction during telescopic movement of said parts.

16. In a train pipe coupler, a coupler jaw including a body having at its forward side a contact face to which a fluid passage opens, a gasket within said passage movable in a direction to and from said face, means for applying fluid pressure to the passage, and a flexible pressure expansive diaphragm within said passage connected with the gasket and with the inner wall of the passage and adapted, under application of fluid pressure, to press the gasket in a direction toward said face.

17. In a train pipe coupler, a coupler jaw including a body having at its forward side a contact face to which a fluid passage opens, a gasket within said passage movable to and from a position of projection beyond said contact face, a resilient diaphragm in said passage, one end of said diaphragm engaging said gasket and urging it to a position of projection, the other end of said diaphragm connected to a wall within said air passage, and a tube within said diaphragm and connected to the end of said diaphragm adjacent said gasket, said tube clearing the inner surface of the air passage, whereby air under pressure within said passage passes between said tube and said diaphragm and presses said diaphragm into tight engagement with said gasket.

18. In a coupling, a pair of jaws adapted to be moved longitudinally into interengagement with each other, each of said jaws mounted for pivotal movement about a vertical axis, resilient means for each jaw yieldingly resisting movement of said jaw from a normal position with reference to the vertical axis, said jaws having cooperating contact faces adapted to meet when the jaws are interengaged, a lug on the contact face of one jaw adapted to engage the contact face of the other jaw during relative longitudinal movement of the jaws toward interlocking position and thereby to cause pivotal movement of said jaws against said resisting means, and there being a pocket in the contact face of the other jaw into which said lug is finally received to allow the jaws to pivot by actuation of said resisting means, whereby the said contact faces of the jaws are brought together.

19. In combination with a car, a train pipe coupler embodying a coupler arm extending longitudinally of the car body, a vertical pivot pin carried by the outer end of said coupler arm, an air pipe connecter jaw mounted to pivot on one portion of said pivot pin, and a steam pipe connecter jaw mounted to pivot independently of said air pipe connecter jaw on another portion of said pivot pin.

20. In combination with a car, a train pipe coupler embodying a coupler arm extending longitudinally of the car body, a vertical pivot pin carried by the outer end of said coupler arm, an air pipe connecter jaw mounted on said pivot pin, said pivot pin depending below said air pipe connecter jaw, and a steam pipe connecter jaw mounted on the lower portion of said pivot pin.

21. In combination with a car, a train pipe coupler embodying a coupler arm extending longitudinally of the car body, a vertical pivot pin carried by the outer end of said coupler arm, an air pipe connecter jaw mounted on said pivot pin, a spring-pressed plunger mounted on said coupler arm and yieldingly resisting pivotal movement of said jaw on said pivot pin, said pivot pin depending below said air pipe connecter jaw, a steam pipe connecter jaw mounted on the lower portion of said pivot pin, and a spring-pressed plunger supported from said coupler arm and adapted to resist pivotal movement of said steam head.

22. In combination: a vehicle; coupler supporting means comprising a hanger secured to the body of said vehicle, and a coupler arm supporting member mounted on said hanger for horizontal transverse movement with respect to the vehicle body; a horizontally extending coupler arm; a horizontal transverse pivot for said coupler arm on said horizontally movable supporting member; and resilient means applied to said horizontally movable member and arranged yieldingly to resist displacement of the coupler arm about said horizontal transverse pivot throughout horizontal movements of said supporting member.

23. In combination: a vehicle; coupler supporting means comprising a hanger secured to the body of said vehicle, and a coupler arm supporting member mounted on said hanger for horizontal transverse movement with respect to the vehicle body; a horizontally extending two part coupler arm arranged for relative longitudinal movement, one part on the other; a horizontal transverse pivot for one of said coupler arm parts on said horizontally movable supporting member; and resilient means applied to said horizontally movable supporting member and arranged yieldingly to resist displacement of the coupler arm about said transverse horizontal pivot throughout horizontal movements of said supporting member.

24. In combination: a vehicle; coupler supporting means comprising a hanger secured to the body of said vehicle, and a coupler arm supporting member mounted on said hanger for horizontal transverse movement with respect to the vehicle body; a horizontally extending two part coupler arm arranged for relative longitudinal movement, one part on the other; a horizontal transverse pivot for the first of said coupler arm parts on said horizontally movable supporting member; and resilient means applied to said horizontally movable supporting member and to the second of said coupler arm parts and arranged yieldingly to resist displacement of the coupler arm about said horizontal transverse pivot throughout horizontal movements of said supporting member and throughout relative longitudinal movements of said coupler arm parts.

25. In combination: a vehicle; coupler supporting means comprising a hanger secured to the body of said vehicle, and a coupler arm supporting member mounted on said hanger for horizontal transverse movement with respect to the vehicle body; a horizontally extending two part coupler arm arranged for relative longitudinal movement, one part on the other; a horizontal transverse pivot for the first of said coupler arm parts on said horizontally movable supporting member; and a flat spring applied to said horizontally movable supporting member and to the second of said coupler arm parts and arranged yieldingly to resist displacement of the coupler arm about said horizontal transverse pivot throughout horizontal movements of said supporting member and throughout relative longitudinal movements of said coupler arm parts.

26. In combination: a vehicle; coupler supporting means comprising a hanger secured to the body of said vehicle, and a coupler arm supporting member mounted on said hanger for horizontal transverse movement with respect to the vehicle body; a horizontally extending coupler arm including two telescoping tubes, one sliding on the other; a horizontal transverse pivot mounting for one of said tubes on said horizontally movable supporting member; and resilient means applied to said horizontally movable supporting member and arranged yieldingly to resist displacement of the telescoping tubes about said horizontal transverse pivot throughout horizontal movements of said supporting member and throughout telescopic movements of said tubes.

27. In combination: a vehicle; coupler supporting means comprising a hanger secured to the body of said vehicle, and a coupler arm supporting member mounted on said hanger for horizontal transverse movement with respect to the vehicle body; a horizontally extending coupler arm including two telescoping tubes, one sliding on the other; a horizontal transverse pivot mounting for one of said tubes on said horizontally movable supporting member; and resilient means applied to said horizontally movable supporting member and to the other of said tubes and arranged yieldingly to resist displacement of the telescoping tubes about said horizontal transverse pivot throughout horizontal movements of said supporting member and throughout telescopic movements of said tubes.

28. In combination: a vehicle; coupler supporting means comprising a hanger mounted on the vehicle, and a coupler arm supporting member mounted on said hanger for horizontal transverse movement with respect to the vehicle body; a horizontally extending coupler arm; a horizontal transverse pivot for said coupler arm on said horizontally movable supporting member; and resilient means applied to said horizontally movable member and arranged yieldingly to resist displacement of the coupler arm about said horizontal transverse pivot throughout horizontal movements of said supporting member.

29. In combination, a vehicle, a coupler extending in the direction of the vehicle length and applied to said vehicle for horizontal swinging movement about a horizontal axis longitudinal of the vehicle, and for vertical swinging movement about a horizontal axis transverse of the vehicle length, and for rotative adjustment movement about a longitudinal axis non-coincident with the longitudinal swinging axis, and resilient means yieldingly resisting the last mentioned movement.

30. In combination, a vehicle, a coupler extending in the direction of the vehicle length and applied to said vehicle for horizontal swinging movement about a horizontal axis longitudinal of the vehicle, and for vertical swinging movement about a horizontal axis transverse of the vehicle length, and for rotative adjustive movement about a longitudinal axis non-coincident with the longitudinal swinging axis, and a single resilient means yieldingly resisting the two last mentioned movements.

31. In combination: a coupler carrying hanger; a supporting member mounted on said hanger for horizontal transverse movement with respect thereto; a horizontally extending coupler arm including two telescoping tubes, one sliding on the other; a horizontal transverse pivot for one of said tubes on said horizontally movable supporting member; a coupler jaw on the other of said tubes; and resilient means for yieldingly resisting displacement of said tubes about said horizontal transverse pivot and for yieldingly resisting relative rotation of the jaw carrying tube with respect to the transversely pivoted tube.

32. In combination, a vehicle, a coupler arm extending in the direction of the vehicle length and applied to said vehicle for vertical swinging movement relative thereto, such coupler including a coupler head having a vertical contact face adapted to meet the contact face of a mating coupler head, and an intermediate mounting for the coupler head including a vertical pivot about which the coupler head swings horizontally, and a longitudinal axis coincident with the arm about which the head rotates in a vertical plane.

33. In combination, a vehicle, a coupler arm extending in the direction of the vehicle length and applied to said vehicle for vertical swinging movement relative thereto, such coupler including a coupler head having a vertical contact face adapted to meet the contact face of a mating coupler head, an intermediate mounting for the coupler head including a vertical pivot about which the coupler head swings horizontally, and a longitudinal axis coincident with the arm about which the head rotates in a vertical plane, and yielding means yieldingly opposing the several movements of the coupler.

34. In a coupler, a horizontal arm member having a longitudinally extending bore opening to the outer end thereof, a jaw member mounted on a vertical pivot on the outer end of said arm, a compression spring in said arm bore, and there being cam elements between said spring and said jaw such that said spring is compressed upon pivotal displacement of the jaw in either direction from a center position and thereupon acts to return said jaw to center position.

35. In a device of the character described, a supporting body, a cradle suspended from said body for relative horizontal movement, a coupler arm supported in said cradle for vertical swinging movement about a horizontal pivot, and means acting between said cradle and arm yieldingly supporting said arm in a position of horizontal extension.

36. A coupler arm comprising a pair of tubular members associated for longitudinal telescopic movement, a compression spring coaxial with said tubular members and acting to resist telescopic contractive movement of said members, a compression spring inside said tubular members, an abutment in one of said tubular members for one end of the last mentioned spring, and a tension rod connected between the other end of said last mentioned spring and the other of said tubular members to resist telescopic expansive movement of the members.

37. A coupler arm comprising a pair of tubular members associated for longitudinal telescopic movement, a compression spring inside said tubular members acting to resist telescopic contractive movement of said members, another compression spring inside said tubular members, an abutment in one of said tubular members for one end of the last mentioned spring, and a tension rod connected between the other end of said last mentioned spring and the other of said tubular members to resist telescopic expansive movement of the members.

38. In combination, a vehicle, a coupler extending horizontally in the direction of the vehicle length and embodying a cylinder member and a plunger member arranged for horizontal telescopic movement, one of said parts being applied to said vehicle for pivotal movement about a horizontal axis which is transverse of the vehicle length, and yielding means for holding the cylinder and plunger against relative rotation and for holding said one part against pivotal movement in one direction during telescopic movement of said parts.

39. In a coupling, the combination of a pair of jaws adapted to be moved into interengagement with each other, said jaws having meeting vertical contact faces diagonal to the longitudinal axis of the coupling, and each of said jaws mounted for pivotal movement on a vertical axis, means for each jaw yieldingly resisting pivotal movement of said jaw from a normal interengaging position, and means on each jaw adapted to engage the other jaw during relative longitudinal movement of the jaws to cause pivotal movement of the jaws against said resisting means through a position out of said normal interengaging position.

40. In a device of the character described, a pair of coupler arms applied to the proximate ends of a pair of vehicles and extending towards each other, each of said coupler arms mounted on its vehicle for adjustive swinging movements relative thereto, a pair of jaws carried by the outer ends of said arms and adapted to be moved into interengagement with each other, said jaws having meeting vertical contact faces diagonal to the longitudinal axis of the coupler arms, an intermediate mounting for each jaw on its coupler arm involving a vertical pivot axis, means for each jaw yieldingly resisting pivotal movement of said jaw from a normal interengaging position, and means on each jaw adapted to engage the other jaw during relative longitudinal movement of the jaws to cause pivotal movement of the jaws against said resisting means through a position out of said normal interengaging position.

41. In a train pipe coupler, a pair of interlocking jaws adapted to be moved along a longitudinal axis into interengagement with each other, said jaws having engaging faces diagonal to the longitudinal axis of the coupler, each jaw having a nose lug that rides under a surface on the other jaw diagonal to the engaging faces of the jaws but substantially parallel to the longitudinal axis of the coupler, said diagonal surface making such an angle with the engaging faces of the coupler that pressures normal to the engaging faces of the two jaws will not slide the nose lugs along said diagonal surfaces.

42. In a train pipe coupler, a pair of interlocking jaws adapted to be moved along a longitudinal axis into interengagement with each other, said jaws having engaging faces diagonal to the longitudinal axis of the coupler, a spring-urged locking plunger in each jaw arranged to move substantially parallel to the engaging faces of the coupler jaws into locking engagement with the other jaw, and engaging surfaces between said locking plungers and jaws diagonal to the engaging faces of the jaws.

43. In a train pipe coupler, a pair of interlocking jaws adapted to be moved along a longitudinal axis into interengagement with each other, said jaws having engaging faces diagonal to the longitudinal axis of the coupler, a spring-urged locking plunger in each jaw arranged to move substantially parallel to the engaging faces of the coupler jaws into locking engagement with the other jaw, and engaging surfaces between said locking plungers and jaws diagonal to the engaging faces of the jaws, the angle between the line of engagement of said last mentioned surfaces and the diagonal faces of the jaws being sufficiently small that forces normal to said diagonal faces cannot cause retraction of said spring-urged plungers, but being such that force exerted as the couplers are pulled apart longitudinally may cause retraction of said plungers to unlock the jaws.

44. In a train pipe coupler, a pair of interlocking jaws adapted to be moved along a longitudinal axis into interengagement with each other, each jaw including a tongue having an inner contact face and forming a throat at the base of said face, the throat of one jaw adapted to receive the tongue of the other, and said contact faces disposed in a vertical plane diagonal to the longitudinal axis of the coupler, and a spring-urged locking plunger in the tongue of each jaw arranged to move therein substantially parallel to the contact face of said jaw to engage a seating surface in the throat of the other jaw, the engaging surfaces between said plungers and seating surfaces being diagonal to the engaging faces of the jaws.

45. In a train pipe coupler, a pair of interlocking jaws adapted to be moved along a longitudinal axis into interengagement with each other, each jaw including a tongue having an inner contact face and forming a throat at the base of said face, the throat of one jaw adapted to receive the tongue of the other, and said contact faces disposed in a vertical plane diagonal to the longitudinal axis of the coupler, and a spring-urged locking plunger mounted to move in the throat of each jaw substantially parallel to the contact face of said jaw to engage a seating surface on the tongue of the other jaw, the engaging surfaces between said plungers and seating surfaces being diagonal to the engaging faces of the jaws.

46. In combination, a train pipe coupler including a pair of coupler arms extending along a longitudinal line from the proximate ends of a pair of cars, coupler jaws mounted on the ends of said coupler arms and adapted to interengage, said jaws having engaging faces diagonal to the longitudinal axis of the coupler, a spring-urged locking plunger in each jaw arranged to move substantially parallel to the engaging faces of the coupler jaws into locking engagement with the other jaw, and a tension member associated with each jaw operatively connected at one end to said plunger to move it against its spring pressure, and at the other end, in effect, to the corresponding car, so that when said cars are pulled apart the tension members will be tensed to retract the locking plungers to allow the coupler jaws to separate.

47. In combination with a car, a train pipe coupler embodying a coupler arm extending longitudinally of the car body, an air pipe connecter jaw mounted to pivot on a vertical axis on the end of said coupler arm, and a steam pipe connecter jaw mounted in vertical displacement with respect to said air pipe connecter jaw, said steam pipe jaw arranged to pivot on a vertical axis independently of said air pipe connecter jaw.

48. In combination with a car, a train pipe coupler embodying a coupler arm extending longitudinally of the car body, an air pipe connecter jaw mounted to pivot on a vertical axis on the end of said coupler arm, said air pipe connecter jaw having an engaging face diagonal to the longitudinal line of the coupler and to which opens an air conduit arranged normally to said engaging face, and a steam pipe connecter jaw mounted in vertical displacement with respect to said air pipe connecter jaw, said steam pipe jaw arranged to pivot on a vertical axis independently of said air pipe connecter jaw, and said steam pipe jaw having an engaging face diagonal to the longitudinal line of the coupler, but opposite to the diagonal air jaw engaging face, and to which opens a steam conduit arranged normally to said engaging face.

49. In a train pipe coupler, a pair of interlocking jaws adapted to be moved along a longitudinal axis into interengagement with each other, each jaw including a vertical tongue plate having an inner contact face and forming a throat at the base of said face, the throat of one jaw adapted to receive the tongue plate of the other, and said tongue plates being disposed in a vertical plane diagonal of the longitudinal axis of the coupler, and a spring pressed locking member mounted in the throat of each jaw to move in a direction substantially parallel to the opposing tongue plate to engage a rearward surface on the tip of said opposing tongue plate and thereby lock the tongue plates together.

50. In a train pipe coupler, a pair of interlocking jaws adapted to be moved along a longitudinal axis into interengagement with each other, each jaw including a vertical tongue plate having an inner contact face and forming a throat at the base of said face, the throat of one jaw adapted to receive the tongue plate of the other, and said tongue plates being disposed in a vertical plane diagonal of the longitudinal axis of the coupler, and a spring pressed locking member mounted on each jaw and working substantially parallel to said tongue plates between the throat of each jaw and forward tongue plate end of the other jaw, and a tension member adapted to be connected, in effect, to the vehicle on which the coupler is mounted and to cause retraction of said locking member as the vehicles are pulled apart.

51. A two part coupler arm comprising one part adapted to be mounted on a supporting body, a second part adapted to be extended from said one member and to retract, a compression spring coaxial with said arm adapted to resist retractive movement of said second part relative to said one part, another spring coaxial with said arm, an abutment on one of said arm parts for one end of said last mentioned spring, and a tension rod connected between the other end of said last mentioned spring and the other of said arm parts to resist extensive movement of said second arm part relative to said one part.

In witness that I claim the foregoing I have hereunto subscribed my name this 16th day of June, 1930.

ALBERT S. JOHNSON.